United States Patent [19]
Ishikawa et al.

[11] Patent Number: 5,535,413
[45] Date of Patent: Jul. 9, 1996

[54] SYSTEM INCLUDING PLURALITY OF DATA DRIVEN PROCESSORS CONNECTED TO EACH OTHER

[75] Inventors: Yutaka Ishikawa, Tenri; Shinichi Yoshida, Kashihara, both of Japan

[73] Assignee: Sharp Kabushiki Kaisha, Osaka, Japan

[21] Appl. No.: 533,860

[22] Filed: Sep. 26, 1995

Related U.S. Application Data

[63] Continuation of Ser. No. 207,155, Mar. 8, 1994, abandoned.

[30] Foreign Application Priority Data

Mar. 10, 1993 [JP] Japan ..................... 5-049189

[51] Int. Cl.$^6$ ..................... G06F 15/62
[52] U.S. Cl. ............. 395/800; 395/162; 364/DIG. 1; 364/232.22; 364/261.3; 364/259
[58] Field of Search ................ 395/800, 200.15, 395/163, 162, 166

[56] References Cited

U.S. PATENT DOCUMENTS

| | | | |
|---|---|---|---|
| 4,149,240 | 4/1979 | Misunas et al. | 395/800 |
| 4,156,909 | 5/1979 | Barton et al. | 395/600 |
| 4,866,421 | 9/1989 | Szczepanek | 370/85.15 |
| 5,021,947 | 6/1991 | Campbell et al. | 395/800 |
| 5,099,418 | 3/1992 | Pian et al. | 395/650 |
| 5,113,339 | 5/1992 | Komatsu et al. | 395/200 |
| 5,117,489 | 5/1992 | Komori et al. | 395/375 |
| 5,125,097 | 6/1992 | Okamoto et al. | 395/800 |
| 5,182,799 | 1/1993 | Tamura et al. | 395/400 |
| 5,257,392 | 10/1993 | Okamoto | 395/800 |
| 5,317,708 | 5/1994 | Edgar | 395/425 |
| 5,317,756 | 5/1994 | Komatsu et al. | 395/800 |
| 5,327,569 | 7/1994 | Shima et al. | 395/800 |

FOREIGN PATENT DOCUMENTS 5-314284 11/1993 Japan.

Primary Examiner—Mehmet B. Geckil

[57] ABSTRACT

The system includes data driven processors each having inputs and outputs. Each processor includes a processing unit processing, according to a program, a data packet having processor specifying information specifying the processor, and an output unit providing a data packet having processor specifying information specifying another processor according to a predetermined condition. The system further includes an input path selecting device and a transmission path device. The input path selecting device has inputs respectively connected to the system inputs, and outputs. The input path selecting device selects an output of the input path selecting device according to the contents of the received data packet and a predetermined condition to provide the data packet therefrom. The transmission path connects the outputs of the input path selecting device and the system outputs, and the inputs/outputs of the data driven processors to each other. The system may further include an output path selecting device. The output path selecting device is provided between the outputs of the processors in the transmission path device and the system outputs and has a plurality of inputs respectively connected to the outputs of the processors and a plurality of outputs respectively connected to the system outputs. The output path selecting device selects an output depending on the processor specifying information of a received data packet and provides the data packet therefrom.

21 Claims, 7 Drawing Sheets

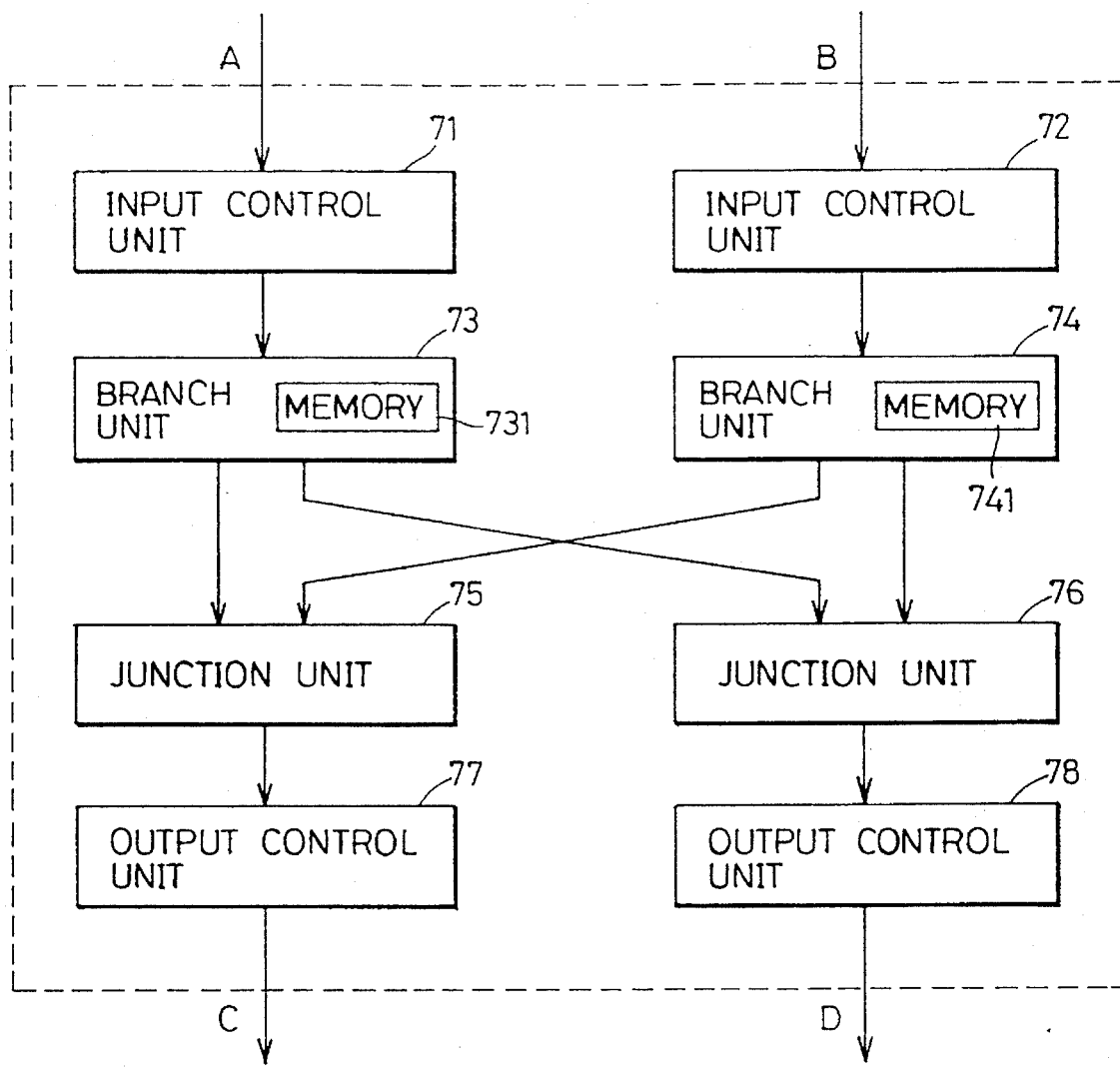

SYSTEM INCLUDING PLURALITY OF DATA DRIVEN PROCESSORS CONNECTED TO EACH OTHER

This application is a continuation of application Ser. No. 08/207,155 filed on Mar. 8, 1994, now abandoned.

BACKGROUND OF THE INVENTION

1. Field of the Invention

The present invention relates to a system including a data driven processor, and more particularly, to a system including a plurality of data driven processors connected in a multi-network manner.

2. Description of the Related Art

In a conventional von Neumann computer, various instructions are prestored in a program memory as programs. The instruction is sequentially read out from an address of the program memory sequentially specified by a program counter for execution thereof.

On the other hand, a data driven processor is one type of a non-Neumann computer. The data driven processor does not have a concept of sequential execution of instructions by a program counter. The data driven processor employs an architecture based on parallel processing of instructions. In the data driven processor, when data to be subjected to operation is available, the instruction can be executed. Because a plurality of instructions are simultaneously driven by data, programs are executed in parallel according to a natural flow of data. As a result, it is considered that a time required for operation is substantially shortened by the data driven processor.

A method of connecting data driven processors associated with the present invention is taught in Japanese Patent Application No. 4-117406 (Japanese Patent Laying-Open No. 5-314284 laid open on Nov. 26, 1993) assigned to the same assignee as that of the present application. Japanese Patent Laying-Open No. 5-314284 is incorporated herein by reference. The above method of connecting the data driven processors made it possible to change programmably the destination of data provided from each data driven processor without reconnecting data driven processors.

Some problems still remain to be solved. As the number of data driven processors connected increases, a path between processors becomes longer and some processor pairs cannot exchange data directly so on and so on. The latter problem causes secondary problems. For example, processors used for relay of indirect exchange of data suffer from the overhead, a program to be stored in the processor becomes more complicated, and so on.

SUMMARY OF THE INVENTION

One object of the present invention is, therefore, to provide a data packet path between any processors in a system including a plurality of data driven processors connected to each other, and to shorten the path as much as possible.

Another object of the present invention is to ensure the shortest data packet path between any processors both in a system including a plurality of data driven processors connected to each other and in a large-scale system having a plurality of such systems connected.

The system according to the present invention has a plurality of system inputs and a plurality of system outputs. The system receives at the plurality of system inputs a data packet storing information specifying a destination processor, carries out a predetermined processing, and provides a resultant data packet at the plurality of system outputs. The system includes a plurality of data driven processors each having a plurality of inputs and a plurality of outputs. Each data driven processor includes a processing unit which processes, according to a predetermined data flow program, a data packet having processor specifying information specifying the processor itself, and an output unit providing data packets having processor specifying information specifying other processors out of data packets received at the plurality of inputs of the data driven processor and data packets provided from the processing unit at an output selected according to a predetermined condition out of the plurality of outputs of the data driven processor. The system further includes an input path selecting device and a transmission path device. The input path selecting device has a plurality of inputs respectively connected to the plurality of system inputs and a plurality of outputs. The input path selecting device selects one of the plurality of outputs of the input path selecting device according to the contents of an applied data packet and a predetermined condition, and provides the data packet therefrom. The transmission path device connects the plurality of outputs of the input path selecting device and the system outputs, to the plurality of data driven processors, so that there exists at least one data packet path, either directly or indirectly, from the outputs of the input path selecting device to any of the plurality of data driven processors, and that there exists at least one data packet path, either directly or indirectly, from any of the plurality of data driven processors to the system outputs.

It is possible to apply a data packet applied to the system inputs to any data driven processor via the input path selecting device, the data driven processors, and the transmission path device. Since provision of the input path selecting device enables selection of a transmission path through which a data packet is applied, a data packet path to an arbitrary data driven processor can be shorter than would be otherwise.

Preferably, the system of the present invention further includes an output path selecting device. The output path selecting device is provided between the outputs of the plurality of data driven processors and the plurality of system outputs in the transmission path device. The output path selecting device includes a plurality of inputs respectively connected to the outputs of the plurality of data driven processors, and a plurality of outputs respectively connected to the plurality of system outputs. The output path selecting device selects one of the plurality of outputs depending on the processor specifying information of a data packet received at the inputs, and outputs the relevant data packet therefrom.

Using the output path selecting device, a system output from which a data packet is to be provided can be selected. In a large-scale system including a plurality of systems of the present invention connected to each other, it is possible to apply a data packet to any data driven processor in any system from any data driven processor in any system via the input path selecting devices, the data driven processors, the transmission path devices, and the output path selecting devices of the plurality of the systems of the present invention in the large-scale system. Since provision of the input path selecting device and the output path selecting device enables selection of a transmission path and a system output through which a data packet is to be applied, a data packet path to an arbitrary data driven processor can be shorter than would be otherwise.

BRIEF DESCRIPTION OF THE DRAWINGS

The foregoing and other objects, features, aspects and advantages of the present invention will become more apparent from the following detailed description of the present invention when taken in conjunction with the accompanying drawings.

The present invention will become more fully understood from the detailed description given hereinbelow and the accompanying drawings which are given by way of illustration only, and, thus, are not limitative of the present invention, and wherein:

FIG. 5 is a block configuration diagram of a router according to one embodiment of the present invention.

DETAILED DESCRIPTION OF THE PREFERRED EMBODIMENTS

Figure 1:
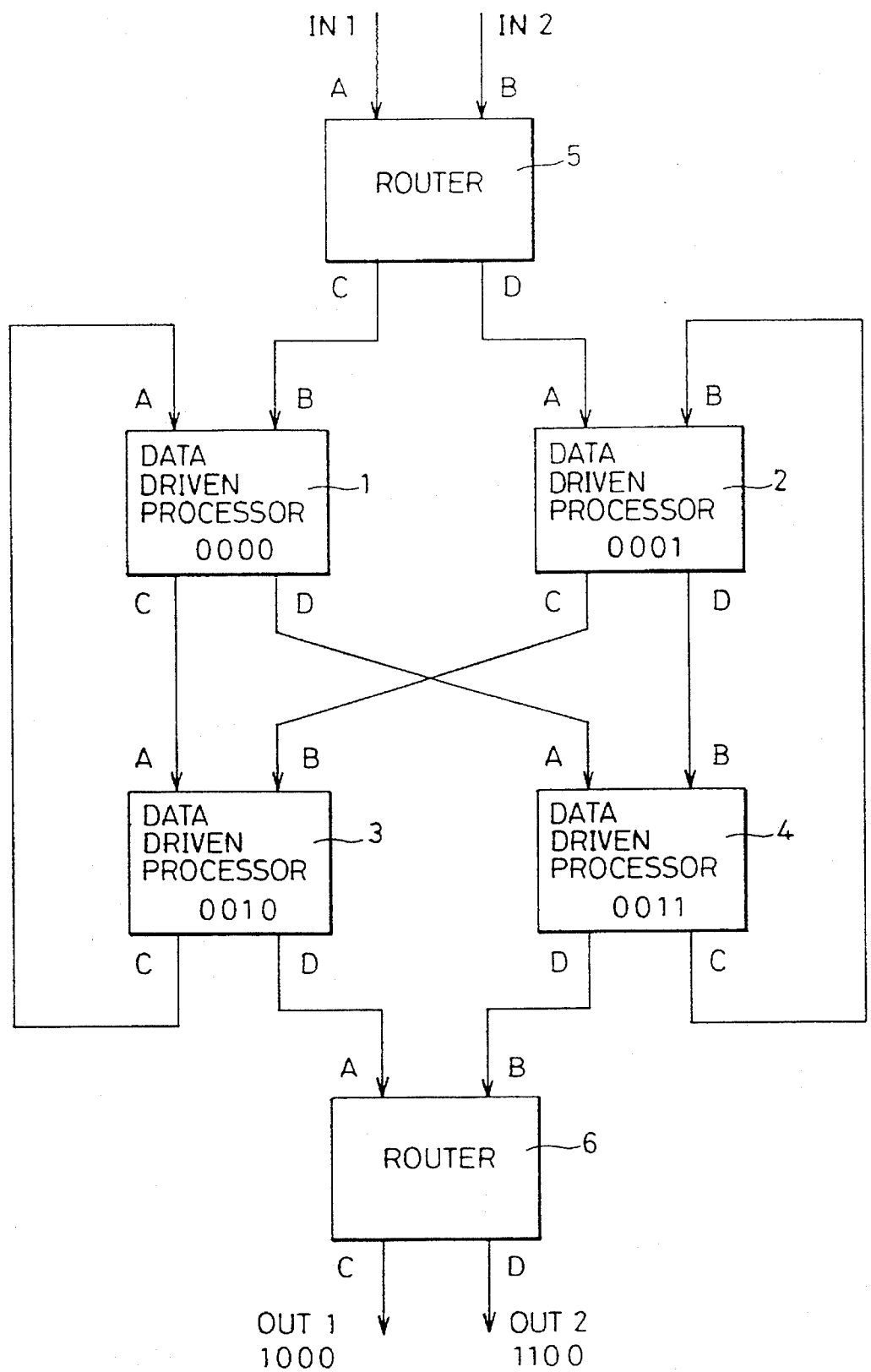
FIG. 1 is a diagram showing a system configuration including a plurality of data driven processors according to one embodiment of the present invention.

Referring to FIG. 1, the system according to one embodiment of the present invention includes routers (path selecting units) 5 and 6, and four data driven processors 1 to 4. Each of the data driven processors and each of the routers have inputs A and B, and outputs C and D. The system of FIG. 1 has inputs IN1 and IN2, and outputs OUT1 and OUT2.

Figure 2:
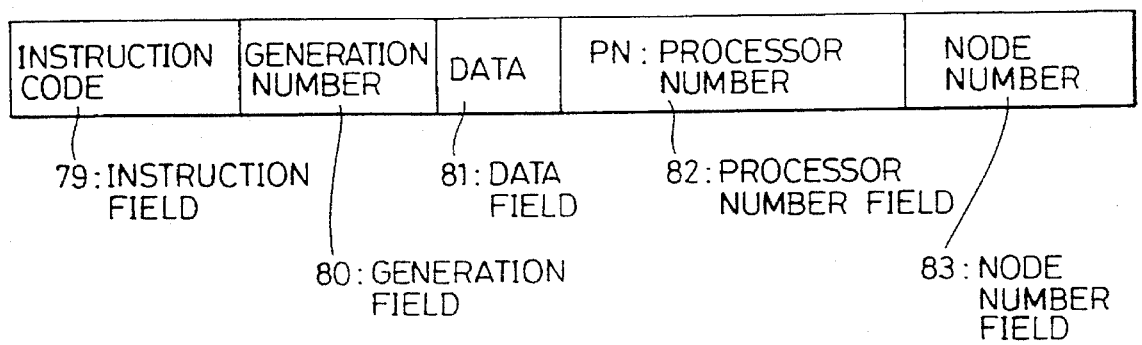
FIG. 2 shows a field configuration of a data packet processed in the data driven processors of FIG. 1.

Referring to FIG. 2, a data packet to be processed by the data driven processors of FIG. 1 includes an instruction field 79 storing an instruction code, a generation field 80 storing a generation number, a data field 81 storing data, a processor number field 82 storing a processor number PN, and a node number field 83 storing a node number.

Figure 3:
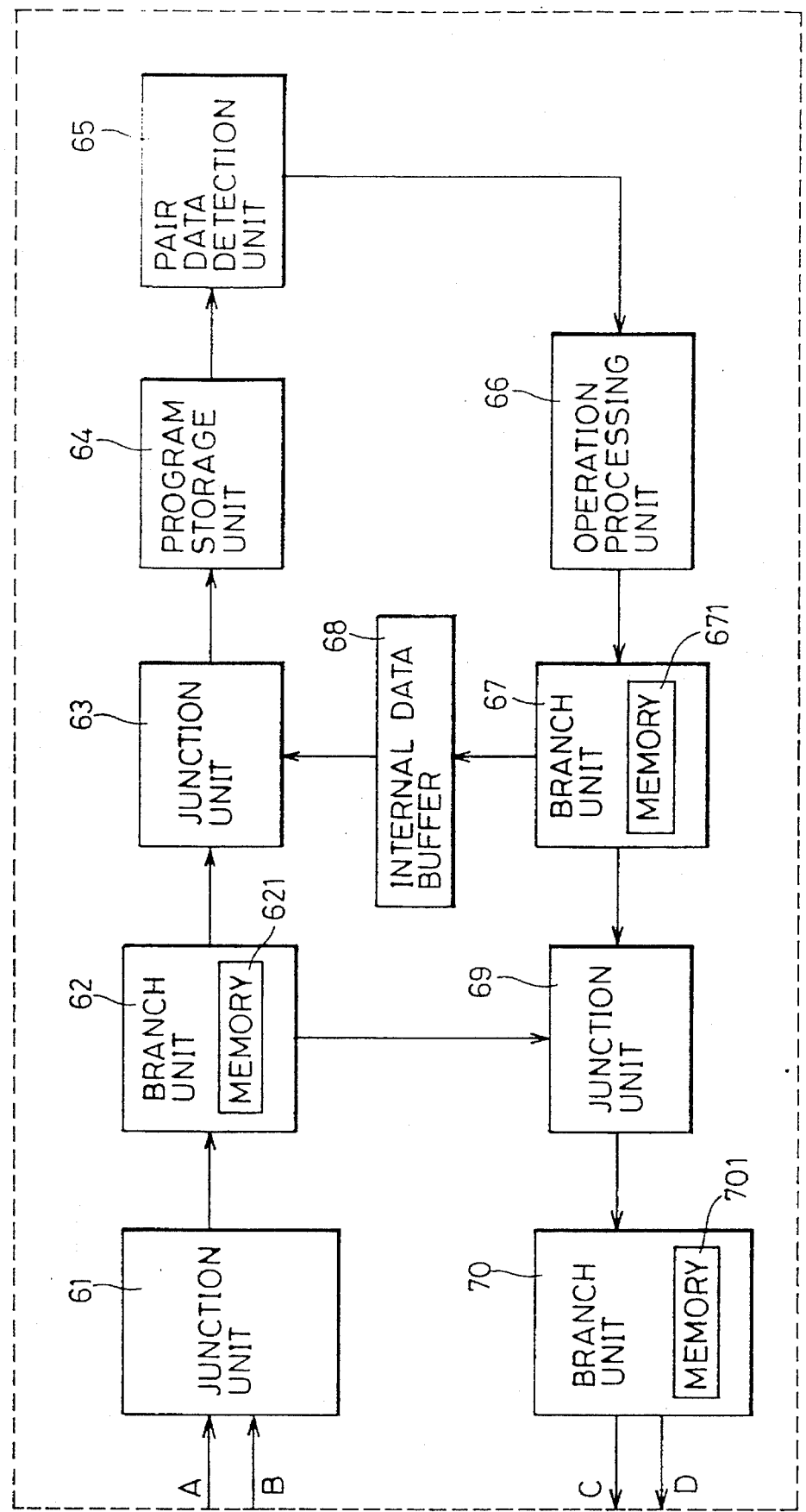
FIG. 3 is a block diagram showing a configuration of a data driven processor according to one embodiment of the present invention.

Referring to FIG. 3, the data driven processor according to one embodiment of the present invention includes junction units 61, 63 and 69 receiving an applied data packet to provide the same in a FIFO (First-In, First-Out) manner, branch units 62, 67 and 70 receiving an applied data packet to select an output destination according to the contents of the data packet to provide the data packet thereto, a program storage unit 64 storing a data flow program, a pair data detection unit 65, an operation processing unit 66, and an internal data buffer 68.

Referring to FIG. 3, junction unit 61 provides a data packet applied from input A or B to branch unit 62 in a FIFO manner.

Branch unit 62 includes a memory 621 prestoring a processor number for uniquely identifying the data driven processor. Branch unit 62 compares a processor number PN of an applied data packet with a processor number set in memory 621, and determines whether or not both numbers match. When both processor numbers match, branch unit 62 provides the data packet to junction unit 63. Junction unit 63 applies the data packet to program storage unit 64. When both processor numbers do not match, branch unit 62 provides the data packet to junction unit 69. Junction unit 69 applies the applied data packet further to branch unit 70.

Branch unit 70 includes a memory 701 prestoring a branch condition. Branch unit 70 provides the data packet to any one of outputs C and D according to processor number PN of the data packet and the branch condition prestored in memory 701.

Figure 4:
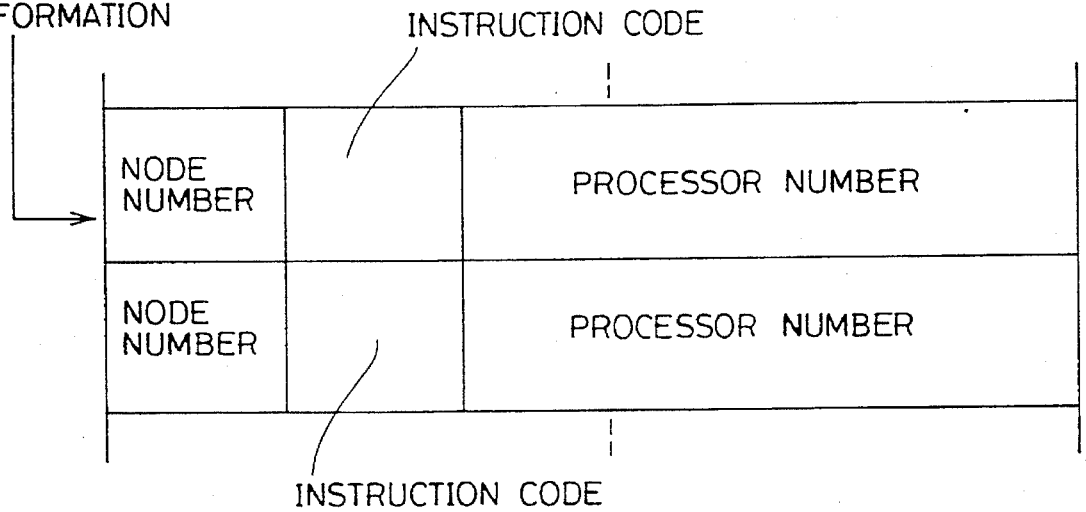
FIG. 4 is a diagram showing an example of storage contents of a program storage unit of FIG. 3.

Program storage unit 64 prestores a data flow program. The data flow program includes a plurality of instructions each including an instruction code, a node number and a processor number, as shown in FIG. 4. Program storage unit 64 reads out the next node number, instruction code and processor number from the data flow program according to addressing based on destination information of an applied data packet, that is, a generation number or node number. Program storage unit 64 further stores the read out node number, instruction number and processor number in node number field 83, instruction field 79 and processor number field 82 of the data packet, respectively, and provides the data packet to pair data detection unit 65.

Pair data detection unit 65 carries out matching of a data packet provided from program storage unit 64. More specifically, pair data detection unit 65 detects two different data packets (pair data) having the same destination information. Pair data detection unit 65 additionally stores the content of a data field of one data packet of the pair data in a data field of the other data packet, and provides the other data packet to operation processing unit 66.

Operation processing unit 66 receives the data packet provided from pair data detection unit 65. Operation processing unit 66 carries out the operation processing according to the instruction code of the data packet with respect to data in the data field of the data packet. Operation processing unit 66 stores the operation processing result in the data field of the data packet, and provides the data packet to branch unit 67.

Branch unit 67 includes a memory 671 prestoring a processor number of the relevant processor. Branch unit 67 receives the data packet provided from operation processing unit 66. Branch unit 67 compares processor number PN of the data packet with the processor number of the processor preset in memory 671. Branch unit 67 provides the data packet to internal data buffer 68 when both numbers match, and provides the data packet to junction unit 69 otherwise.

Internal data buffer 68 receives the data packet, and sequentially provides the data packet to junction unit 63.

In the data driven processor, a data packet repeatedly flows through a path from program storage unit 64 back to program storage unit 64 via pair data detection unit 65, operation processing unit 66, internal data buffer 68, and junction unit 63. During the flow, the data packet is processed according to the program stored in program storage unit 64.

The data packet output from branch unit 70 of the data driven processor is applied to a data driven processor connected in the next stage, where the data packet is subjected to the same processing as described above.

The processor number and branch condition is set in each memory of branch units 62, 67 and 70 prior to program execution using an external terminal (not shown), such as a so-called DIP switch, connected to the processor. They may be set using software.

FIG. 5 shows a router according to one embodiment of the present invention in a block diagram. The router includes input control units 71 and 72 respectively connected to inputs A and B, branch units 73 and 74, junction units 75 and 76, and output control units 77 and 78 respectively connected to outputs C and D.

Input control units 71 and 72 receive data packets externally applied to the router, and sequentially provide the data packets to branch units 73 and 74.

Branch units 73 and 74 incorporate memories 731 and 741. A branch condition is preset in memories 731 and 741 by an external terminal or software. Branch units 73 and 74 selectively provide the data packet to one of junction units 75 and 76 according to the processor number PN of the data packet and the branch condition preset in memories 731 and 741.

For example, the branch condition set in memory 731 or 741 is "if the least significant bit of the processor number of a data packet is 0, then provide the data packet to junction unit 75, and if the least significant bit is 1, provide the data packet to junction unit 76." The branch condition is so set that a path through which the data packet flows until it reaches a data driven processor at which the data packet is to be processed becomes the shortest.

Junction units 75 and 76 provide applied data packets to output control units 77 and 78, respectively, in a first-in, first-out manner. Output control units 77 and 78 provide the applied data packets to outputs C and D in a first-in, first-out manner.

The system configured in a multi-network manner of FIG. 1 is again referred to. It is assumed that the system processes a data packet applied thereto via input IN2 with data driven processor 1 and data driven processor 4, and outputs the data packet at output OUT2. A path of the data packet in this case will be described hereinafter.

It is assumed that binary 0000, 0001, 0010 and 0011 are assigned as processor numbers to data driven processors 1, 2, 3 and 4, respectively, as shown in FIG. 1. It is further assumed that 1000 and 1100 are respectively assigned as processor numbers to data driven processors (not shown) connected to outputs OUT1 and OUT2.

It is assumed that a first branch condition "if the least significant bit of processor number PN of a data packet is 0, then send the data packet to output C, and if the least significant bit is 1, send the data packet to output D" is preset in data driven processors 1, 2 and router 5. A second branch condition "if the two uppermost bits of processor number PN of a data packet are 00, send the data packet to output C, or else, send the data packet to output D" is preset in data driven processors 3 and 4. A third branch condition "if the second uppermost bit of processor number PN of a data packet is 0, send the data packet to output C, and if the second uppermost bit is 1, send the data packet to output D" is preset in router 6.

A data packet flows as follows. A data packet whose processor number PN is 0000 is applied to input B of router 5 from input IN2 of the system. Processor number PN of the data packet is "0000", and thus the least significant bit is 0. According to the above-described branch condition, router 5 applies the data packet to input B of data driven processor 1 from output C.

Data driven processor 1 processes the data packet applied to input B, and rewrites processor number PN of the data packet into "0011". Rewriting of the processor number is carried out as follows. The next processor number is read out from program storage unit 64 (refer to FIG. 3) by addressing according to the contents of the data packet. The next processor number read out is stored in the processor number field 82 of the data packet. As a result, processor number PN is rewritten.

New processor number PN is "0011". The least significant bit is "1". The data packet is applied to input A of data driven processor 4 from output D according to the above-described first branch condition.

Data driven processor 4 processes the data packet applied to input A. Processor number PN of the data packet is "0011". Processor number PN is rewritten into "1100" by the next processor number read out from program storage unit 64 so that the data packet is sent to output OUT2 in this processing. The uppermost two bits of processor number PN of the data packet are not "00", but "11". According to the above-described second branch condition, the data packet is provided from output D of data driven processor 4.

Referring to FIG. 1, the data packet provided from output D of data driven processor 4 is applied to input B of router 6. Processor number PN of the data packet is "1100". The second uppermost-bit is "1". Router 6 provides the data packet from output D according to the above-described third branch condition. The data packet is applied to an externally provided data driven processor, not shown, whose processor number is "1100", via output OUT2 of the system.

As described above, in the system shown in FIG. 1, a data packet flows only via data driven processors 1 and 4. The data packet is processed by these processors, and applied to a subsequent system from data driven processor 4.

Figure 6:
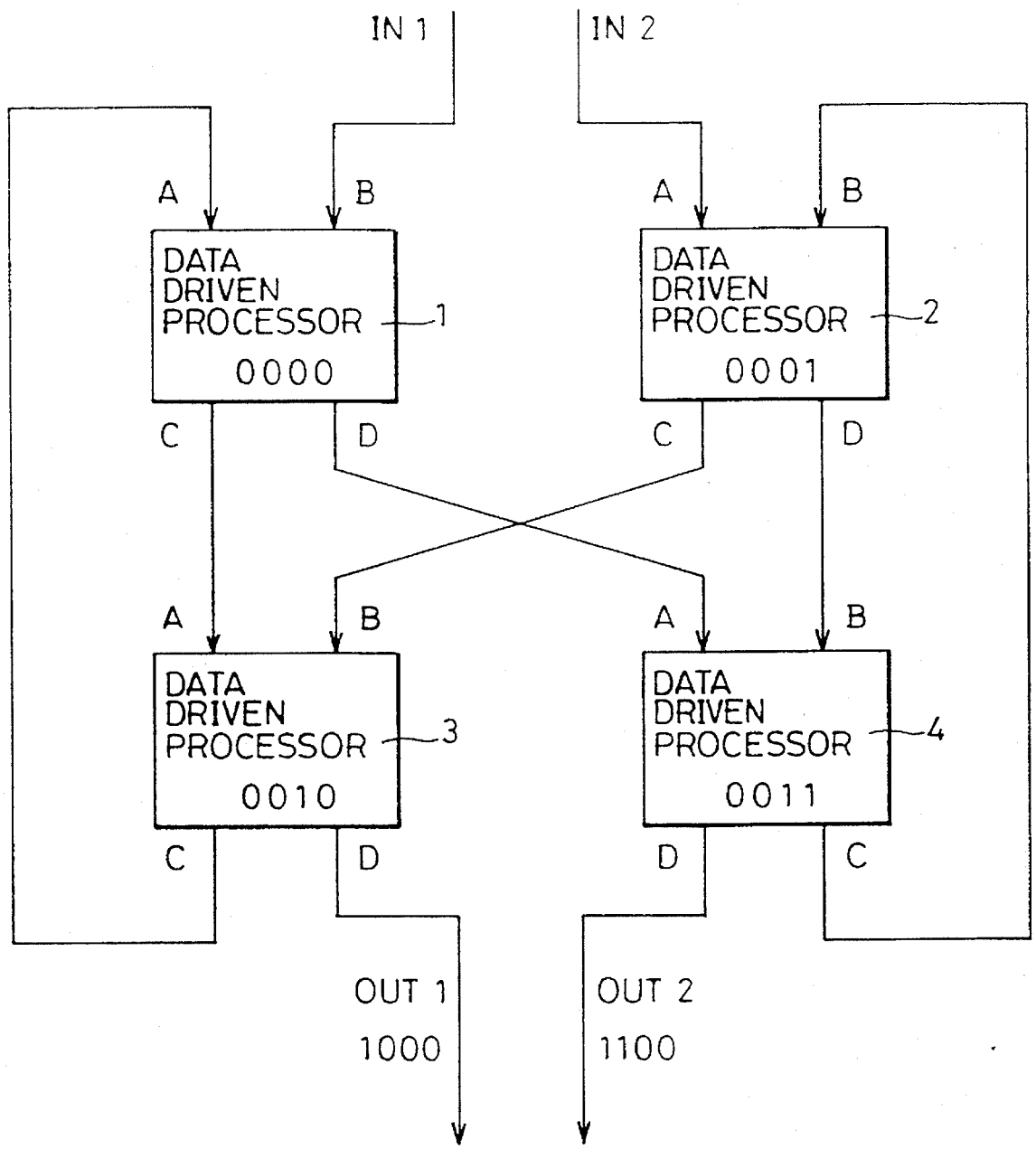
FIG. 6 is a block configuration diagram of the system of FIG. 1 without a router.

A system shown in a block diagram in FIG. 6 is similar to the system of FIG. 1 except that the former does not include a router. It is assumed that the system of FIG. 6 applies the same processing as that of the system of FIG. 1 to a packet similar to the above. More specifically, it is assumed that the system receives a data packet at input IN2, the data packet is processed at data driven processor 1, the data packet is further processed at data driven processor 4, and that the data packet is provided to an externally provided data driven processor whose processor number is "1100" from output OUT2 of the system.

A data packet flows in the system as follows. A data packet whose processor number PN is "0000" is applied to the system inputs from input IN2. The data packet is applied to input A of data driven processor 2. Data driven processor 2 processes the applied data packet, and provides the processed data packet. At this time, the least significant bit of processor number PN is "0". According to the above-described first branch condition, the data packet is applied to input B of data driven processor 3 via output C of data driven processor 2.

Data driven processor 3 processes the applied data packet and provides the processed data packet. At this time, since the uppermost two bits of processor number PN of the data packet are "00", the data packet is provided to data driven processor 1 via output C of data driven processor 3.

Data driven processor 1 receives the data packet via input A, and processes the same. In this processing, processor number PN of the data packet is rewritten into "0011". The least significant bit of rewritten processor number PN is "1". According to the above-described first branch condition, the data packet is applied to input A of data driven processor 4 via output D of data driven processor 1.

Data driven processor 4 receives the data packet applied to input A, and processes the same. In this processing, processor number PN of the data packet is rewritten into "1100". The uppermost two bits of new processor number PN of the data packet are not "00". Therefore, the data packet is provided from output D of data driven processor 4, and applied to an externally provided data driven processor whose processor number is "1100" via output OUT2.

More specifically, in this case, a data packet flows through data driven processors 2, 3, 1 and 4 in this order. The path length is twice as long as that of FIG. 1.

As described above, when the same processing is carried out in the system of FIG. 1 including routers and in the system of FIG. 6 not including routers, the path of FIG. 1 through which a data packet flows is significantly shorter than that of FIG. 6. The reason is that in the system of FIG. 1, the router first select, according to processor number PN of an input data packet the shortest path through which the data packet can reach a processor at which the data packet is to be processed, and the data packet is sent to the selected path.

Figure 7:
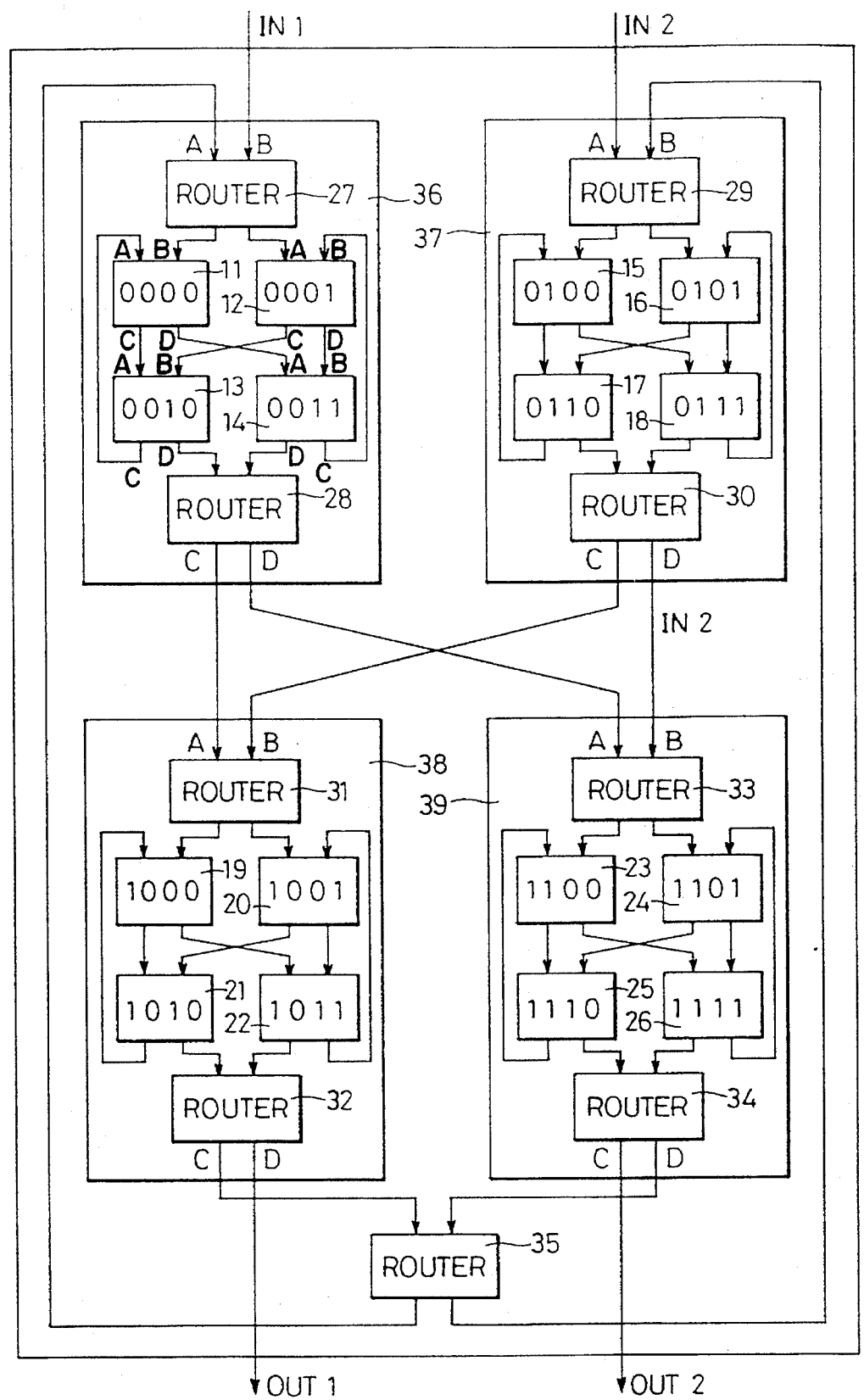
FIG. 7 is a block configuration diagram of a large-scale system including four such systems as shown in FIG. 1.
Figure 8:
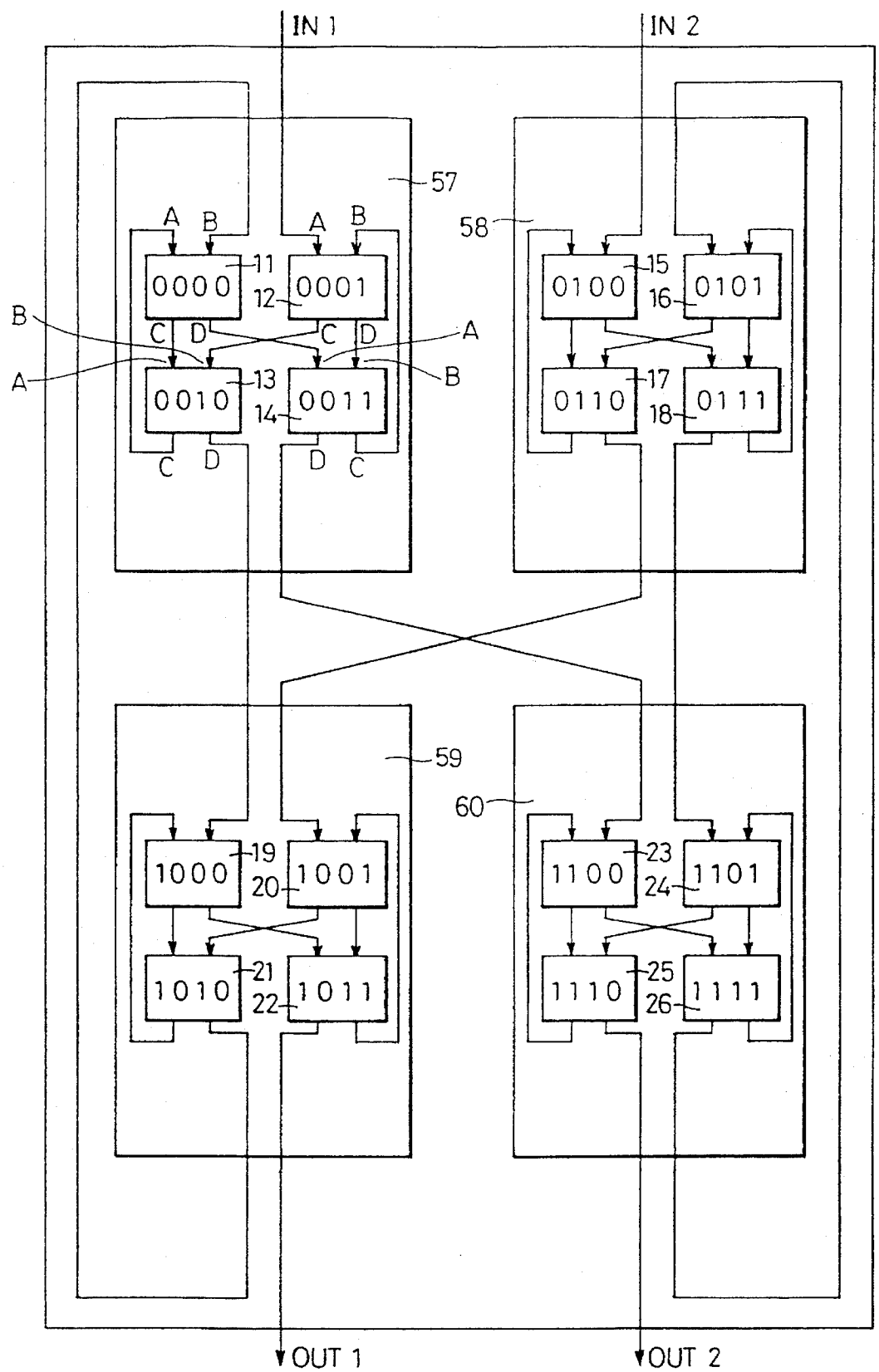
FIG. 8 is a block configuration diagram of a large-scale system including four such systems as shown in FIG. 6.

FIG. 7 is a block diagram of a large-scale system including four such systems as shown in FIG. 1. FIG. 8 is a block diagram of a large-scale system including four such systems as shown in FIG. 6.

The system having a multi-network configuration of FIG. 7 includes subsystems 36–39 each having the same configuration as that of the system of FIG. 1, and a router 35 having inputs connected to outputs of subsystems 38 and 39.

Each subsystem includes four processor groups. A processor number is assigned to each processor in the system as shown in the figure. The detailed description will be given later.

Subsystem 36 includes a router 27 disposed on the input side, a router 28 disposed on the output side, processors 11 and 12 having inputs connected to outputs of router 27 on the input side, and processors 13 and 14 having inputs connected to outputs of processors 11 and 12 and having outputs connected to inputs of router 28 on the output side.

Subsystem 37 includes a router 29 disposed on the input side, a router 30 disposed on the output side, processors 15 and 16 having inputs connected to outputs of router 29 on the input side, and processors 17 and 18 having inputs connected to outputs of processors 15 and 16 and having outputs connected to inputs of router 30 on the output side.

Subsystem 38 includes a router 31 disposed on the input side, a router 32 disposed on the output side, processors 19 and 20 having inputs connected to outputs of router 31 on the input side, and processors 21 and 22 having inputs connected to outputs of processors 19 and 20 and having outputs connected to inputs of router 32 on the output side.

Subsystem 39 includes a router 33 disposed on the input side, a router 34 disposed on the output side, processors 23 and 24 having inputs connected to outputs of router 33 on the input side, and processors 25 and 26 having inputs connected to outputs of processors 23 and 24 and having outputs connected to inputs of router 34 on the output side.

Processor numbers of processors 11–26 are binary 0000, 0001, 0010, 0011, 0100, 0101, 0110, 0111, 1000, 1001, 1010, 1011, 1100, 1101, 1110 and 1111, respectively. The uppermost two bits of the processor number of the group are "00" in subsystem 36, "01" in subsystem 37, "10" in subsystem 38, and "11" in subsystem 39. In order to identify subsystems 36 to 39, group numbers "00" "01", "10" and "11" will be assigned to respective subsystems hereinafter.

The branch condition set in routers 27, 29, 31 and 33 on the input side is the same as that set in router 5 of FIG. 1. The branch condition set in routers 28, 30, 32 and 34 on the output side is the same as that set in router 6 of FIG. 1.

It is assumed that the branch condition set in two processors connected to the router on the input side of each subsystem is the same as that set in processors 1 and 2 shown in FIG. 1, that is, the above-described first branch condition. It is assumed that a fourth branch condition "if the uppermost two bits of processor number PN of a data packet match the group number of the subsystem, provide the data packet to output C, else, provide the data packet to output D" is set in two processors connected to the router on output side of each subsystem.

The third branch condition is set in router 35 similar to the case of router 6 of FIG. 1.

The system of FIG. 8 includes subsystems 57 to 60. Subsystems 57 to 60 are the same as subsystems 36 to 39 shown in FIG. 7 except that subsystems 57 to 60 do not have routers 27 and 28, 29 and 30, 31 and 32, and 33 and 34, respectively. The system of FIG. 8 is the same as that of FIG. 7 except for the above-described point, and that the former system does not have router 35. The branch condition and the processor number set in each processor are the same as those of FIG. 7.

It is assumed that, in each of the above-described systems of FIGS. 7 and 8 in a multi-network manner, a data packet is sent from a data driven processor 15 (PN=0100) to a data driven processor 23 (PN=1100).

In the case of the system of FIG. 7 to which routers are provided, a data packet is processed at data driven the processor 15, and processor number PN of the data packet is rewritten into "1100". Since the least significant bit of the processor number of the data packet is "0", the data packet is applied to input A of processor 17 from output C of processor 15 according to the above-described first branch condition.

The following processing is carried out in processor 17. Junction unit 61 (refer to FIG. 3) which receives a data packet from input A provides the same to branch unit 62 in a FIFO manner. Branch unit 62 detects mismatching of processor number PN of the data packet and a processor number (0110) which is allocated to processor 17. Therefore, branch unit 62 applies the data packet to junction unit 69. Junction unit 69 applies the data packet to branch unit 70. Branch unit 70 provides the data packet from output D according to the above-described fourth branch condition. The fourth branch condition is "if the uppermost two bits of processor number PN of the data packet match the group number, then send the data packet to output C, or else, send the data packet to output D." The uppermost two bits of processor number PN of the data packet in question, that is, the group number, is "11". The group number of subsystem 17 to which processor 17 belongs is not "11" but "01". Therefore, processor 17 provides the data packet from output D.

Referring again to FIG. 7 and according to the above-described procedure, the data packet is applied to input A of router 30 from output D of processor 17. Router 30 provides the applied data packet from an output selected according to the above-described third branch condition. The third branch condition is "if the second uppermost bit of processor number PN of a data packet is 0, then send the data packet to output C, and if the second uppermost bit is 1, send the data packet to output D." Since the second uppermost bit of processor number PN of the data packet is not "0" but "1", router 30 applies the data packet to input B of router 33 from output D.

Router 33 receives the data packet, and selects a processor to which the data packet is to be applied according to the above-described first branch condition. More specifically, since processor number PN of the data packet is "1100", and the least significant bit is "0", router 33 provides the data packet to processor 23 from output C.

As described above, in the system of FIG. 7, a data packet is applied from processor 15 (PN=0100) to processor 23 (PN=1100) only via processor 17.

In the case of the system of FIG. 8, a data packet flows as follows. A data packet sent from processor 15 is processed at processor 17 and provided from output D of processor 17, similar to the case in the system of FIG. 7. In this case, input A of processor 20 is connected to output D of processor 17. Therefore, the data packet is applied to input A of processor 20.

Processor 20 selects a processor to which the data packet is to be applied according to the above-described first branch condition. Since the least significant bit of processor number PN of the data packet is "0", processor 20 provides the data packet from output C, and applies the same to input B of processor 21.

Processor 21 selects a processor to which the data packet is to be applied according to the above-described fourth branch condition. The uppermost two bits of processor number PN of the data packet are "11", which are different from the group number (10) of processor 21. Therefore, processor 21 applies the data packet to input B of processor 11 from output D.

Processor 11 provides the data packet from an output selected according to the above-described first branch condition. Processor number PN of the data packet is "1100". Therefore, processor 11 applies the data packet to processor 13 from output C.

Processor 13 provides the data packet from output D selected according to the above-described fourth condition. The data packet is applied to processor 19. Processor 19 applies the data packet to processor 21 as described above. Processor 21 applies the data packet to processor 11. More specifically, the data packet continues to circulate permanently in a loop formed of processor 11, processor 13, processor 19 and processor 21. The data packet never arrives at data driven processor 23 to which it is destined, which stagnates the processing in the system.

One method for solving the above-described problems in the system of FIG. 8 not including routers is to use processor 24 (processor number 1101), for example, as a relay unit of a data packet. In the method, processor number PN of a data packet sent from processor 15 is first set as "1101". When the data packet is applied to processor 24, processor number PN of the data packet is rewritten into "1100". The data packet having its processor number rewritten into "1100" can reach processor 23 via processor 25. However, in this case, the data packet must pass through processors 18, 24 and 25 before it reaches processor 23 from processor 15.

As described above, in the system including routers of FIG. 7, a data packet can move freely from one processor to another processor. On the other hand, in the system not including routers as shown in FIG. 8, movement of a data packet is limited. For example, a data packet cannot be directly transmitted from the above-described data driven processor 15 (processor number 0100) to data driven processor 23 (processor number 1100). As described above, a data packet may circulate permanently in a loop. Although this problem can be solved by using another processor as a relay unit, this solution provides other problems. For example, the load of a processor used as a relay unit may be increased, and a program to be stored in the processor may be more complicated.

By using such a router as provided by the present invention, it is possible to move a data packet between any processors even in a system of a large-scale multi-network configuration. A program for a data driven processor does not become complicated, thereby making it possible to increase the processing speed. In addition to that, even an algorithm for path selection to be used in such a large-scale system as shown in FIG. 7 can be obtained by simple extension of one used in a relatively simple system as shown in FIG. 1.

It should be noted that when the processing which does not require router 5 or 6 is carried out, router 5 or 6 may be removed.

As described above, according to a method of connecting data driven processors of the present invention, the router provided in an input stage of the system selects a transmission path through which a data packet applied to the system is provided so that a path becomes short through which the data packet reaches a processor at which it is to be processed. Each processor processes an applied data packet, and selectively sends the processed data packet to a transmission path which makes short a path through which the data packet reaches a processor at which it is to be processed. Therefore, in the present system, a path of a data packet moving between data driven processors is shortened.

According to the method of connecting data driven processors of the present invention, a router selecting an input path and each processor select, whenever a data packet is provided, a path through which the data packet can reach a processor at which it is to be processed. Therefore, it is possible to input/output a data packet between any processors in the system.

According to the present invention, even if the above-described systems are multi-connected, a router provided at an output stage of each system selectively sends a data packet provided from each system to a transmission path between systems which makes short a path along which the data packet moves. A data packet path between systems or between data driven processors can be shortened. A router for selecting an input path and a router for selecting an output path, and each processor select, whenever a data packet is provided, a path through which the data packet can reach a processor at which it is to be processed, and send the data packet. Therefore, if a number of systems are connected, it is possible to input/output a data packet between any processors, and between any systems.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A system having a plurality of system inputs and a plurality of system outputs, said system inputs receiving a data packet having processor information to carry out a predetermined data processing and provide a resultant data packet at said plurality of system outputs, comprising:

a plurality of data driven processor means, each having a plurality of inputs and a plurality of outputs, processing means for processing according to a predetermined data flow program the data packet having processor information specifying one of said data driven processor means, and output means for providing said resultant data packet having processor information specifying another data driven processor means from the data packet received at said inputs of the data driven processor means and for directing said resultant data packet provided by said output means to an output selected from said outputs of the data driven processor means according to a predetermined condition;

input path selecting means having a plurality of inputs respectively connected to said system inputs and a plurality of outputs, for connecting one of the inputs to one of the outputs according to the processor information of the data packet and a predetermined condition to direct the data packet therefrom; and transmission path means for connecting said outputs of the input path selecting means to said plurality of data driven processor means and for connecting said plurality of data driven processor means to said system outputs, so that there exists at least one data packet path directly or indirectly from said outputs of the input path selecting means to any of said plurality of data driven processor means, and from any of said plurality of data driven processor means to said system outputs the input path selecting means selecting a shortest path to be taken by a data packet, to a desired processing means at which the data packet is to be processed, through the system by selecting one of the outputs of said input path selecting means according to a value of the least significant bit of the processor information of the data packet.

2. The system as recited in claim 2, wherein said input path selecting means selects one of the outputs of said input path selecting means depending on a value of a predetermined portion of the processor information of the data packet received at the plurality of inputs of said input path selecting means.

3. The system as recited in claim 2, wherein said input path selecting means has two outputs, each output being connected to one input of different data driven processor means by said transmission path means, and selects one of said outputs of the input path selecting means depending on a value of the least significant bit of the processor information of the data packet received at said plurality of inputs of said input path selecting means.

4. The system as recited in claim 1, further comprising:

output path selecting means provided between the outputs of said plurality of data driven processor means and said plurality of system outputs, and having a plurality of inputs respectively connected to the outputs os said plurality of data driven processor means and a plurality of outputs respectively connected to said plurality of system outputs for selecting one of said outputs of the output path selecting means depending on the processor information of the data packet received at said inputs of the output path selecting means to direct the data packet therefrom.

5. The system as recited in claim 4, wherein said output path selecting means selects one of the outputs of said output path selecting means depending on a value of a predetermined portion of the processor information of the data packet.

6. The system as recited in claim 5, wherein said output means of the data driven processor means includes processor output selecting means for selecting one of the outputs of said data driven processor means depending on the processor information of the data packet to direct the data packet to the selected output.

7. The system as recited in claim 6, wherein said processor output selecting means compares the processor information of the data packet with a predetermined value to select one of the outputs of said data driven processor means depending on the comparison result.

8. The system as recited in claim 7, wherein said plurality of data driven processor means include:

first data driven processor means having a plurality of outputs all connected to other data driven processor means, and second data driven processor means having a first output connected to one input of said output path selecting means and a second output connected to an input of another data driven processor means in the system, the processor output selecting means of said second data driven processor selects an output depending on whether or not a predetermined value unique to the system and a predetermined portion of the processor specifying information of the data packet match.

9. The system as recited in claim 8, wherein said processor output selecting means of the second data driven processor means selects said second output connected to said another data driven processor means in the system when the predetermined value unique to the system and the predetermined portion of the processor information of the data packet match, or otherwise, selects said first output connected to the input of said output path selecting means.

10. The system as recited in claim 1, wherein said input path selecting means has two inputs and two outputs, said plurality of data driven processor means include two first data driven processor means each having two inputs and two outputs, and two second data driven processor means each having two inputs and two outputs, each of said outputs of the two first data driven processor means is respectively connected to one of the inputs of said two second data driven processor means, one input of each of said two first data driven processor means is respectively connected to one output of said input path selecting means, one output of each of said two second data driven processor means is respectively connected to the other input of each of said two first data driven processor means, and the other output of each of said two second data driven processor means is respectively connected to one of said system outputs.

11. The system as recited in claim 10, further comprising:

output path selecting means having two inputs respectively connected to the outputs of said two second data driven processors by said transmission path means and two outputs connected to said system outputs for selecting one of said two outputs of said output path selecting means depending on the processor information of the data packet received at said two inputs of said output path selecting means to direct the data packet therefrom.

12. The system as recited in claim 11, wherein said output path selecting means selects one of the two outputs of said output path selecting means depending on whether or not a value of a predetermined portion of the processor information of the data packet received at said two inputs of the output path selecting means matches a predetermined value unique to the system.

13. A data driven processor network having a first and second input and a first and second output, a data packet being passed from one of the first and second inputs of the network to one of the first and second outputs of the network, the network comprising:

an input router, having two inputs connected to the network inputs, respectively, and two outputs, for routing a data packet received from one of the first and second inputs to a remainder of the network via one of the two outputs;

a first data driven processor receiving as a first input a data packet from the input router;

a second data driven processor receiving as a first input a data packet from the input router;

a third data driven processor receiving as inputs a data packet from each of the first and second data driven processors;

the first data driven processor receiving as a second input a data packet from the third data driven processor;

a fourth data driven processor receiving as inputs a data packet from each of the first and second data driven processors;

the second data driven processor receiving as a second input a data packet from the third data driven processor; and an output router for routing a data packet received from one of the third and fourth data driven processors to one of the first and second outputs of the network;

the input router selecting a shortest path to be taken by a data packet, to a desired data driven processor at which the data packet is to be processed, through the network as a function of destination information in the data packet.

14. A data driven processor network as in claim 13, wherein:

the data packet includes a processor number field;

the input router, the first data driven processor, and the second data driven processor each has a C output and a D output, and each operates upon a data packet as follows:
if the least significant bit of the processor number in the data packet is zero, then the C output is selected; and
else the D output is selected.

15. A data driven processor network as in claim 14, wherein:

for the input router, the C output is connected to the first data driven processor and the D output is connected to the second data driven processor;

for the first data driven processor, the C output is connected to the third data driven processor and the D output is connected to the fourth data driven processor; and for the second data driven processor, the C output is connected to the third data driven processor and the D output is connected to the fourth data driven processor.

16. A data driven processor network as in claim 13, wherein:

the data packet includes a processor number field;

the third data driven processor and the fourth data driven processor each has a C output and a D output, and each operates upon a data packet as follows:
if the two most significant bits of the data packet are both zero, 00, then the C output is selected; and
else the D output is selected.

17. A data driven processor network as in claim 16, wherein:

for the third data driven processor, the C output is connected to the first data driven processor and the D output is connected to the output router; and for the fourth data driven processor, the C output is connected to the second data driven processor and the D output is connected to the output router.

18. A data driven processor network as in claim 13, wherein:

the data packet includes a processor number field, having a most significant bit, MSB, and a next most significant bit MSB-1;

the output router has a C output and a D output and operates upon a data packet as follows:
if the MSB-1 bit is zero, then the C output is selected; and
else the D output is selected.

19. A data driven processor network as in claim 18, wherein:

for the output router, the C output is connected to the first output of the network, and the D output is connected to the second output of the network.

20. A data driven processor network as in claim 13, wherein:

the input router and the output router are each a dedicated router.

21. A system having a plurality of data driven processor networks, the system having a first and second input and a first and second output, a data packet being passed from one of the first and second inputs of the system to one of the first and second outputs of the system, the system comprising:

four data driven processor networks; and a loop-back router;
each network comprising:
an input router, having two inputs connected to the network inputs, respectively, and two outputs, for routing a data packet received from one of the first and second inputs to a remainder of the network via one of the two outputs;
a first data driven processor receiving as a first input a data packet from the input router;
a second data driven processor receiving as a first input a data packet from the input router;
a third data driven processor receiving as inputs a data packet from each of the first and second data driven processors;
the first data driven processor receiving as a second input a data packet from the third data driven processor;
a fourth data driven processor receiving as inputs a data packet from each of the first and second data driven processors;
the second data driven processor receiving as a second input a data packet from the third data driven processor; and an output router for routing a data packet received from one of the third and fourth data driven processors to one of the first and second outputs of the network;

the input router selecting a shortest path to be taken by a data packet, to a desired data driven processor at which the data packet is to be processed, through the network as a function of destination information in the data packet;

a first network of the four networks having one of the inputs of the input router therein connected to one of the system inputs;

a second network of the four networks having one of the inputs of the input router therein connected to one of the system inputs;

a third network of the four networks having the inputs of the input router therein connected to one of network outputs of each of the first and second networks, respectively;

a fourth network of the four networks having the inputs of the input router therein connected to one of network outputs of each of the first and second networks, respectively;

the loop-back router routing a data packet received from one of the outputs of each of the third and fourth network to one of the inputs of each of the first and second networks;

one of the outputs of the third network being connected to a first of the system outputs and one of the outputs of the fourth network being connected to a second of the system outputs.

* * * * *